June 18, 1940.   G. A. TINNERMAN   2,205,323
REINFORCED JOINT OR CONNECTION
Filed July 7, 1938
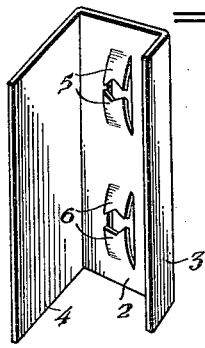
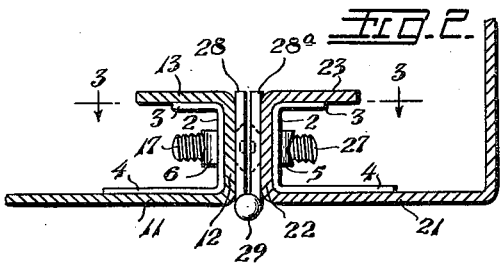
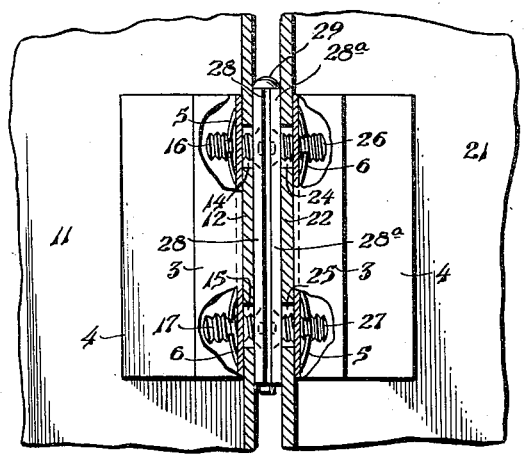
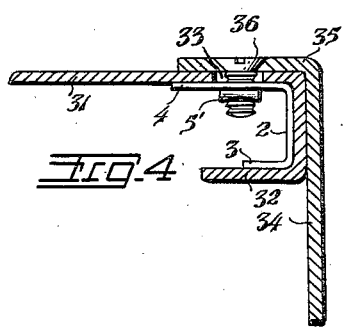
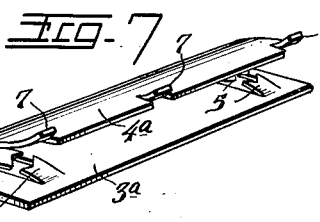
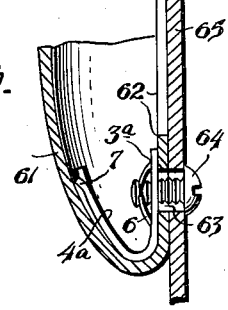
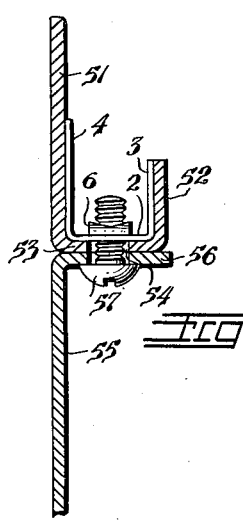
Inventor:
GEORGE A. TINNERMAN
By H. G. Lombard,
ATTORNEY Patented June 18, 1940

2,205,323

UNITED STATES PATENT OFFICE 2,205,323

REINFORCED JOINT OR CONNECTION

George A. Tinnerman, Rocky River, Ohio, assignor, by mesne assignments, to Tinnerman Products, Inc., Cleveland, Ohio, a corporation of Ohio Application July 7, 1938, Serial No. 218,009

20 Claims. (Cl. 189—36)

This invention relates generally to an improved joint or connection for use in structures comprising complementary panel members and the like having flanges or flange sections disposed in superposed or juxtaposed relation to be secured in a completed installation by a simple, inexpensive, easily and quickly applied fastening means.

More particularly, this invention deals with the provision of a joint or connection which is especially advantageous in the fabrication of metallic structures comprising panels and plate-like members having flanges or flange sections disposed in cooperative relation whereby the same may be secured by a novel form of retaining element serving as a combined fastening and reinforcing means for the joint or connection.

The improved joint or connection of the present invention is particularly useful when embodied in a structural unit of a metallic structure, for example, in which the respective parts are not conveniently or readily accessible from both sides in the assembled relation thereof wherefore it becomes necessary to employ some extraneous means for holding the retaining means of the connection in applied position in the assembly preparatory to the operation for completing the fabrication of the structure by suitable screw-threaded fastening means. Constructions of this character requiring a joint or connection of the type exemplified by the instant invention have a wide range and variety of uses in the manufacture of articles comprising the panels and other precisely fitted parts of stoves, ranges, utility cabinets, metal furniture, refrigerator cabinets, casings, metallic building structures and structural details of automobile body constructions and the like.

In the fabrication of sheet metal structures, it is well known that the attachment or ordinary sheet metal parts by means of screws threaded in openings provided therein is generally inefficient and unsatisfactory in that the walls of the openings thus provided are of insufficient thickness to form suitable threads with which a bolt or screw fastening may threadedly engage and be retained effectively in applied position. Also, it is usually impracticable to tighten a threaded member in such an opening since the bolt engaging elements thereof are easily stripped and mutilated by the axial drawing action incident to tightening, thereby causing the opening to become enlarged to the extent that the threaded member is loose in its final applied position and subject to unscrewing and displacement.

Accordingly, conventional threaded nuts provided with special holding means have been found necessary for securing the various parts of sheet metal structures, such nut devices being known in the trade, generally, as clinch-on nuts, tapping plates, etc., and are riveted, spot-welded, or otherwise secured to a sheet metal part preparatory to the assembly thereof in a structure in which it is readily accessible from one side only; that is, in a blind location wherein it is impossible or inconvenient for an operator to hold the nut or nut device while inserting the securing bolt or screw thereto.

Certain sheet metal structures of the type referred to comprise relatively large panels having a smooth exterior appearance and which form a generally hollow construction in a completed assembly wherefore the securing nut element is disposed in a blind location inside the article such that the cooperating bolt or screw fastening must be applied through passages in the panel walls from the accessible side thereof. To hold the nut element in proper position for receiving the bolt and also from turning, the practice has been to use a tapping plate or an auxiliary attaching plate to which one or more units are secured at spaced intervals corresponding with the spacing of the bolt passages in the wall of the article. Such tapping or attaching plate is then permanently fastened, as by riveting or welding, to the inner wall of the article before the closing panel has been fastened into place by suitable bolt fastenings threadedly engaging the nut elements carried thereby. This procedure is not only tedious, time-consuming and expensive because of the cost of such attaching plate and the aforesaid riveting or welding operation, but is objectionable, for the reason that difficulty is frequently experienced in obtaining satisfactory registration between the threaded openings of the permanently secured attaching plate and the bolt passage in the respective parts of an installation.

Furthermore, any such arrangement employing only a conventional threaded nut or nut device is often unsatisfactory and inefficient over a period of use because, generally, no means are provided to prevent looseness and unscrewing of the threaded fastener from applied fastening position. And though any such fastening arrangement may be employed somewhat satisfactorily in certain installations in which cost is of no great consequence, the use thereof is prohibitive in such constructions as require a simple, light weight and inexpensive fastening means which may be easily and quickly applied in an installation in a minimum of time and effort in assembling operations.

In accordance with the present invention, a most practical arrangement for securing sheet metal parts and the like, involves the use of tempered spring metal retaining means having integral bolt receiving means struck and formed therefrom designed for threadedly engaging a threaded fastening member in the manner of a nut. The spring metal material of such retaining means, is, of course, considerably harder than that of the sheet metal supporting structure with which it is employed and accordingly, the bolt engaging elements thereof are admirably suited for providing not only a stronger, superior connection between the part secured and the supporting structure than would be possible otherwise, but also a tightened, practically self-locking, fastening engagement of the securing bolt in final applied position rigidly securing the respective parts of an installation. Thus, there is eliminated the necessity for separate nut elements, lock washers and the like, with the resultant savings in the cost of such devices and the expense involved for labor in the tedious, time-consuming assembling operations which they require.

In many sheet metal structures comprising panel members, it is found necessary or desirable to provide a reinforcing means to prevent buckling or distortion of the panel members under strain when a completed installation is put to use. To this end, of course, separate reinforcing means may be employed, but from the standpoint of most economical production in the manufacture of light-weight structures, it is found most practical to provide such reinforcing means in the manner of a beading or rib usually formed from an integral flange edge of a panel or the like.

Such reinforcing beading or rib usually includes an inturned flange and assumes the form of a substantial U-shape into which suitable retaining means may be disposed preparatory to the assembly of the panel member in a completed installation in which such panel member becomes conveniently or readily accessible from one side only for the application of bolt fastenings to the retaining means in completing the joint or connection.

A primary object of the present invention is to provide such a joint or connection comprising a substantial channel shaped retaining means designed for frictional engagement in applied position with the beading, rib or the like, provided on a panel member preparatory to the assembly thereof in a completed installation.

Another principal object of the invention is to provide for use in such a connection or joint, a retaining means comprising a channel shaped sheet metal part having integral bolt engaging means struck and formed therefrom adapted to engage a threaded member substantially in the manner of a self-locking nut thereby dispensing with the use of separate nut elements and lock washers.

A further object of the invention contemplates the provision of a joint or connection comprising a channel shaped retaining element mounted at the reverse side of a supporting part in such manner that a member may be secured to the exposed surface thereof in substantial flush engagement therewith.

A still further object of the invention is to provide a connection or joint for a sheet metal part having a beading or rib integrally provided thereon and into which a channel shaped retaining element may be applied to reinforce the same and also secure a part thereto.

Further objects and advantages of the invention and other new and useful features in the construction, arrangement and general combination of parts will be apparent to those skilled in the art as a description thereof proceeds with reference to the accompanying drawing in which like reference characters designate like parts throughout the same, and in which:

Fig. 1 is a perspective of a preferred form of channel shaped retaining element showing the integral bolt engaging means provided in the intermediate web portion thereof;

Fig. 2 shows the application and use of such channel shaped retaining members in providing a hinge joint assembly;

Fig. 3 is a section taken along line 3—3 of Fig. 2 looking in the direction of the arrows, parts of the retaining element being broken away to show details of construction of the integral bolt engaging means provided therein;

Fig. 4 is a cross-section of a further embodiment of the invention showing a corner joint construction comprising complementary panel members provided with a modified form of channel shaped retainer;

Fig. 5 is a cross-section of another corner joint construction embodying a further form of channel shaped retainer and comprising substantial panel members one of which is provided with an enamelled or porcelain finish surface and which is secured in such manner as to eliminate stress and strain on such finish surface thereof;

Fig. 6 shows a further embodiment of the invention comprising a butt joint construction employing the retaining means illustrated in Fig. 1;

Fig. 7 shows in perspective another form of channel shaped retainer for a joint or connection comprising an irregular shaped part; and, Fig. 8 is a cross-sectional view of a joint connection embodying the channel shaped retainer illustrated in Fig. 7.

Referring now, more particularly, to Figs. 1-3 inclusive of the drawing, one form of the invention is shown embodied in a hinge joint construction comprising complementarily fitted sheet metal panel members designated generally 11, 21, and either of which, of course, may be a fragment of any sheet metal structure to which it is desired to attach another part by means of a bolt or screw fastening employing the improved connecting means of the present invention. It is apparent that only one such panel member need be provided with a beading receiving a channel shaped retainer but, for purposes of illustration, both panel members are shown provided with oppositely disposed inturned flanges in which relation a channel shaped retainer may be applied to each panel member and a hinge section mounted thereon in providing a hinge joint construction especially useful for sheet metal utility cabinets, refrigerator cabinets, and the like. Generally, it is preferable that the panel member or supporting part be provided with means for holding the retaining member entirely to the reverse side thereof such that a part secured thereto, in this instance a hinge section, may be brought into close flush engagement with the forward side thereof in a completed installation. This, of course, is a highly advantageous arrangement which is particularly useful in installations comprising closely fitted, precisely assembled parts in providing a uniform, smooth, exterior appearance.

As best seen in Fig. 2, in order to adapt the sheet metal panel member 11, for use with a channel shaped retainer, an edge portion thereof is formed into an inturned flange comprising sections 12, 13 forming a substantial U-shaped reinforcing beading or stiffening rib. In the intermediate flange section or substantial wall portion 12 of the reinforcing flange or rib thus formed, apertures 14, 15, Fig. 3, are provided for the reception of suitable bolt fastening devices for securing any selected part to the panel member. The said apertures are preferably formed to a size greater than necessary to receive the bolt fastenings, thereby providing for limited adjustment thereof in such oversize apertures together with the bolt engaging means of the retainer which is movably mounted on the associated panel by frictional engagement with the inturned flange of the beading or rib, preparatory to the application thereof in an installation. In the present illustration, the parts to be secured are hinge sections of a hinge joint construction and accordingly, the cooperating panel member 21 is likewise formed with an inturned flange comprising sections 22, 23, the wall section 22 also being provided with suitable bolt passages 24, 25, Fig. 3.

The retaining means shown in Fig. 1 is constructed from a suitable section of sheet metal, preferably tempered spring steel, which, of course, is considerably harder and possessed of much greater tensile and compressive strength than the material of the sheet metal panel member to which it is attached. The retaining means, however, may be constructed from any other suitable material such as cold rolled metal, so long as it is provided in the form of a substantial channel shape designed to the contour of the panel member for frictional engagement with the inturned flange 13 of the beading or rib substantially as shown in Fig. 2. Thus, in forming the retaining member a suitable section of sheet metal is bent into a substantial channel shape comprising a web portion 2 carrying a pair of arms one of which is indicated by 3 and the other at 4. Preferably the arm 4, which seats against the body of the panel member, is designed for a greater width than the other to bolster the joint or connection and otherwise reinforce the beading or rib when a completed installation is put to use. To this end, the retaining means may be of any suitable length to reinforce any selected portion of the beading, and if desired, may extend throughout the length of the beading for maximum strength.

For use in the installation represented in Figs. 2 and 3, the web portion 2 of the retaining means is shown provided with integral bolt engaging means 5, 6 which are deformed, extruded or otherwise struck and formed to project out of the plane thereof for threadedly engaging the shank of a bolt, screw or other fastener substantially in the manner of a nut device. Any suitable number of such bolt engaging means may be provided in the retainer and, of course, spaced to correspond with the bolt passages 14, 15 in the wall section 12 of the supporting member to lie in substantial registration therewith preparatory to the application of bolt fastenings for completing the assembly.

The said bolt engaging means are shown as comprising opposed, cooperating tongues which are preferably struck and formed from the web portion 2 of the retainer to extend upwardly therefrom in substantial ogee formation with the extremities thereof so spaced as to lie on a helix corresponding substantially to the pitch of the threads on the bolt fastening for most effective, uniform threaded engagement therewith. Such integral bolt engaging means in the retainer, of course, may be provided in any other suitable form or construction depending on the strength required and the use to which the retainer is put, so long as the elements thereof threadedly engage with the bolts as they are driven home. However, it has been found that such bolt receiving means prepared in the form of cooperating tongues, as shown, are the most efficient and most practical in that they are possessed of unusual inherent strength and will not collapse or pull through on tightening of the bolt nor loosen from fastening engagement under constant strain, heavy usage and rough handling of an installation in which they are used. This is possible by reason of the fact that such tongues tend, more effectively, to move toward each other and dig into the grooves intermediate adjacent threads on tightening of the bolt or screw and thereby become embedded in the root diameter of such threaded member in locked, frictional fastening engagement therewith. Thus, any vibration, jarring or strain taking place in a completed mounting cannot cause displacement, reverse rotation or tend toward unscrewing of the threaded fastening member from applied fastening position. It will therefore be appreciated that in the provision of such integral bolt receiving means in the retainer embodied in the joint or connection of the instant invention, the use of individual threaded nuts or lock washers of any kind is entirely dispensed with thereby making for a considerable saving not only in the cost of such nuts and lock washers, but also materially reducing the expense and labor involved in the tedious time-consuming assembling operations which such fastenings require.

In a preferred construction, the arms 3, 4 of the channel shaped retaining member are inclined slightly outwardly from the web portion 2 in normal, untensioned relation such that on being applied to the inturned flange of the beading or rib provided on a supporting part, such arms are compressed toward each other and otherwise frictionally engage the opposed flange sections. Thus in one form of the invention, in making a connection for a part such as a hinge section 28 of the hinge joint illustrated in Figs. 2 and 3, the channel shaped retainer is applied to the beading provided thereon by the inturned flange 13 thereof with the spaced bolt engaging means 5, 6, thereon in substantial registration with the correspondingly spaced bolt passages 14, 15, provided on the wall section 12. The hinge section 28 or other part to be attached may then be secured to the panel structure or the like by suitable bolt fastenings 16, 17 passing through the passages 14, 15 and threadedly engaging the said bolt engaging means 5, 6 provided on the retaining member in substantially locked, tensioned fastening engagement therewith, in the manner aforesaid.

In a similar manner, the cooperating hinge section 28a is attached to the rib or beading of its associated member 21 by frictionally engaging another retainer with the inturned flange section 23 whereupon bolt fastenings 26, 27, may be applied through the passages 24, 25, to the bolt engaging means provided on the retainer to secure the said hinge section in operative position. The hinge itself is of any suitable character but preferably comprises separable hinge sections which may be individually attached to their respective panel members 11, 21, in the manner aforesaid, and readily joined in a completed installation by a slide pintle 29, on being disposed in operative relation to each other as illustrated.

Fig. 4 shows a further form of the invention wherein the connecting means just described embodying a channel shaped retainer, is employed in providing a corner joint construction comprising complementary panel members, or the like, having flanges disposed in overlapping relation. One of the panel members 31, of an assembly of this character, is provided with a beading or rib comprising an inturned flange 32 and one or more bolt passages 33. The other panel 34 is provided with a flange 35 in the manner of a substantial L-shape cooperating with the beading or rib of said panel 31 in interfitting relation therewith substantially as shown. A channel shaped retainer of the general type shown in Fig. 1 is employed, this form of the device, however, being of different construction in the respect that the integral bolt engaging means 5' are provided in the bearing arm 4 thereof. The retainer is applied to the rib or beading of panel member 31 to be frictionally retained in applied position by inturned flange 32 with the bolt engaging means thereof in substantial registration with the bolt passage 33, whereupon the complementary panel member 34 may be secured thereto by bolt fastening 36 applied through said bolt passage to threadedly engage the bolt engaging means on the retainer to complete the required corner joint construction.

Fig. 5 illustrates another form of corner joint construction in which one of the panel members or the like, is provided with an enamelled or porcelain finish surface wherefore it is most advantageous to provide the connection in such form that the stress and strain incident to tightening of the securing means is not transmitted to the enamelled or porcelain surface to cause a cracking or chipping thereof. The supporting panel member 41 is provided with the usual strengthening rib or beading comprising an inturned flange 42 provided with a bolt passage 43. The panel member 45 to be secured, in this instance, is provided with a layer 46 of enamel or porcelain and includes a suitable flange 47 carrying one or more ears 48, or the like, having apertures 43 designed to register with those provided in flange 42 of the supporting panel. The retainer is of the general channel shaped type shown in Fig. 1, but modified to the extent that the shorter arm 3 thereof, opposed to bearing arm 4, is provided with the bolt engaging means 5" for receiving the bolt fastenings 49 in threaded engagement therewith. Thus, the panel member 45, by means of ears 48, may be rigidly secured to the supporting part 41 by fastenings 49 applied at points removed from its finish surface and accordingly, when the bolt fastenings are tightened, the stress and strain incident to such action is not transmitted to the porcelain or enamelled finish surface thereby minimizing and, in effect, practically eliminating cracking or chipping of the porcelain or enamel finish.

Fig. 6 shows a form of butt joint construction employing a channel shaped retainer of the general type illustrated in Fig. 1. Thus, in installations comprising complementary panel members joined edge to edge, one of such panels may be provided with an inturned flange 52 including a wall section 53 provided with one or more bolt passages 54. The cooperating panel 55 need include only an apertured L-shaped flange 56 which may be disposed in abutting relation with the said wall section 53. The channel shaped retainer is applied to the panel 51 to be frictionally retained by the inturned flange 52 thereof whereupon the panel members may be easily and quickly secured in an installation by bolt fastenings 57 threadedly engaging the bolt engaging means 6 of the retainer.

Certain installations require the fastening of irregular shaped parts and often the securing of such parts in blind locations which are conveniently or readily accessible from one side only. The present invention also has for one of its primary objects the securing of such irregular shaped parts by the use of a substantial channel shaped retainer suitably designed to the contour of the irregular shaped part to snugly fit the same in assembled relation therewith and otherwise be frictionally retained thereby preparatory to the application of bolt fastenings for securing such part in a completed installation. Fig. 8 is an example of such an installation and is intended to illustrate an arrangement for securing an irregular shaped part such as a generally concave panel member 61 or other hollow part having an inturned flange or flange section 62 provided with one or more bolt passages 63 receiving bolt fastenings 64 for securing the same to the supporting wall member 65. It will be understood that the said panel member is usually an imperforate hollow body and access to the interior thereof for applying the fastening means cannot be had after the same is once mounted in an installation. It therefore becomes necessary to provide a form of retainer readily fitted to the inner contour thereof to be frictionally held thereby preparatory to the application of bolt fastenings to secure the same. To this end, there may be provided a suitable form of channel shaped retainer such as shown in Fig. 7 which has one arm 4a, formed to the inner contour of the panel member and the other arm 3a, designed to the shape of the inturned flange 62 and provided with suitable bolt engaging means 5, 6. The arm 4a is also provided with tongues, spurs, barbs or similar anchoring means 7, which may be readily struck and formed therefrom to project out of the plane thereof. The channel shaped retainer thus provided is assembled in the hollow panel member 61 to be frictionally retained by the inturned flange 62 thereof with the said bolt engaging means in substantial registration with the bolt passages 63 provided therein. Due to the wedge-shaped configuration of this form of the retainer and its spring frictional engagement with the flange of the panel member, there is the possibility of the same becoming displaced from applied position. In providing the anchoring means 7, however, the retainer is positively held in applied position with the panel member such that the rapid assembly thereof in an installation is permitted with the assurance that the bolt engaging means thereof will be in proper position to receive the bolt fastenings for easily and quickly securing the panel member to the supporting wall 65 substantially in the manner described with reference to the form of the invention illustrated in Figs 2 and 3.

While the retainer in any form is referred to as constructed preferably of spring metal, it is to be understood as fully contemplated within the scope of this invention, that such devices be provided from any other suitable material such as cold rolled metal having sufficient resiliency and other spring-like characteristics permitting its use in the instant combination in the manner and for the purposes aforesaid.

In providing the channel shaped retainer from tempered spring steel, there is, of course, a considerable advantage over cold rolled metal in that greater strength and durability in the joint or connection is provided and an effective self-locking action of the bolt or screw fastening with the bolt engaging means thereof is obtained. A further advantage resides in the fact that the bolt engaging means provided in a spring metal retaining element are necessarily possessed of such hardness as to withstand mutilation and distortion on tightening of a threaded fastening member in locking engagement therewith; thus, in an installation comprising a spring steel retainer, when it is desirable or necessary to dismount the assembly for repairs or replacement of a damaged part, the bolt fastening may be removed without destroying the retaining element or otherwise injuring the bolt engaging means thereof such that it may be employed again in the same or a similar installation. This, of course, is not possible in the use of cold rolled metal which is relatively soft and ductile wherefore the bolt engaging means provided therein are distorted and mutilated in the initial application and tightening of a threaded fastening member therewith. Accordingly, it is to be appreciated that the use of retainers of the type specified provided from spring metal is most desirable and of vast importance in blind locations and other assemblies in which it is impossible or impractical to replace a retaining element without tearing down a considerable portion of a completed structure in order to gain access to the retaining means holding the same onto the reverse side of the supporting part.

In certain installations, however, costs are of paramount importance as respects the application and use of such retaining means whereupon it becomes necessary to construct the same of cheaper grade material such as cold rolled steel having spring-like properties. Such material, of course, does not have the strength and desirable qualities of tempered spring steel, but is sufficiently yieldable and resilient to permit the provision of suitable retainers having a substantially equivalent application and use in the general combination disclosed herein. It is therefore to be understood that the invention in no way is limited by any reference in the description to the effect that the preferred form embodies a retainer or similar locking plate constructed of spring steel. It is also to be understood that the disclosure is not limited, in any manner or form, to the specific bolt engaging means shown and described, it being obvious that equivalent types of such fastening means, per se, may be embodied in numerous modifications within the spirit and scope of the invention without departing from the teachings or essential characteristics thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A joint or connection of the class described comprising, in combination, a lightweight sheet metal structure provided with self-maintained means adapted to receive a stud fastening for securing a cooperating part thereto, said structure comprising a substantial panel member or the like having a body portion provided with a flange arranged in spaced relation to the rearward side thereof, a channel-shaped retainer disposed between said body portion and flange comprising a sheet metal device having a pair of spaced arms one of which is frictionally engaged by said flange to hold the retainer in applied position on said panel member or the like preparatory to securing said cooperating part thereto, said retainer including means for engaging a stud fastening securing said cooperating part to said member.

2. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with a flange arranged in spaced relation to the rearward side thereof, a channel-shaped retainer disposed between said body portion and flange comprising a one-piece sheet metal device having a pair of spaced arms one of which is frictionally engaged by said flange to hold the retainer in applied position on said panel member or the like preparatory to securing said cooperating part thereto, said sheet metal retainer including integral thread engaging means pressed therefrom for threadedly engaging a threaded fastening securing said cooperating part to said member.

3. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with an integral inturned flange arranged in generally parallel and spaced relation to the rearward side thereof, a channel-shaped retainer disposed between said body portion and flange comprising a sheet metal device having a pair of spaced arms one of which is frictionally engaged by said flange to hold the retainer in applied position on said panel member or the like preparatory to securing said coooperating part thereto, said retainer including means for threadedly engaging a threaded fastening securing said cooperating part to said member.

4. A joint or connection of the class described comprising, in combination, a lightweight structure provided with self-maintained means adapted to receive a threaded fastening for securing a cooperating part thereto, said structure comprising an apertured substantial panel member or the like having a body portion provided with a flange in spaced relation to the rearward side thereof, a channel-shaped retainer disposed between said body portion and flange comprising a sheet metal device provided with thread engaging means, said retainer having a pair of spaced arms one of which is frictionally engaged by said flange to hold the retainer in applied position on said panel member or the like with the thread engaging means thereof in line with the aperture in said panel member or the like preparatory to securing said cooperating part thereto by a threaded fastening passing through said aperture.

5. A joint or connection of the class described comprising, in combination, a lightweight structure provided with self-maintained means adapted to receive a threaded fastening for securing a cooperating part thereto, said structure comprising an apertured substantial panel member or the like having a body portion provided with a flange in spaced relation to the rearward side thereof, a channel-shaped retainer disposed between said body portion and flange comprising a one-piece sheet metal device provided with integral thread engaging means pressed therefrom, said retainer having a pair of spaced arms one of which is frictionally engaged by said flange to hold the retainer in applied position on said panel member or the like with the thread engaging means thereof overlying the aperture in said panel member preparatory to securing said cooperating part thereto by a threaded fastening passing through said aperture.

6. A joint or connection of the class described comprising, in combination, a lightweight structure provided with self-maintained means adapted to receive a threaded fastening for securing a cooperating part thereto, said structure comprising an apertured substantial panel member or the like having a body portion provided with an inturned flange adjacent one edge arranged in generally parallel and spaced relation to the rearward side of said body portion, a channel-shaped retainer disposed between said body portion and flange comprising a sheet metal device provided with thread engaging means, said retainer having a pair of spaced arms one of which is frictionally engaged by said flange to hold the retainer in applied position on said panel member or the like with said thread engaging means thereof in line with the aperture in said panel member preparatory to securing said cooperating part thereto by a threaded fastening passing through said aperture.

7. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with a flange in spaced relation to the rearward side thereof, a channel-shaped retainer disposed between said body portion and flange comprising a sheet metal device having a pair of spaced arms one of which is frictionally engaged by said flange to hold the retainer in applied position on said panel member or the like preparatory to securing said cooperating part thereto, one of said arms of the sheet metal retainer carrying thread engaging means for threadedly engaging a threaded fastening securing said cooperating part to said member.

8. A joint or connection of the class described, comprising, in combination, a lightweight sheet metal structure provided with self-maintained means adapted to receive a threaded fastening for securing a cooperating part thereto, said structure comprising an apertured substantial panel member or the like having a body portion provided with a flange in spaced relation to the rearward side thereof, a channel-shaped retainer disposed between said body portion and flange comprising a sheet metal device having a pair of spaced arms one of which is provided with integral thread engaging means, one of said arms being frictionally engaged by said flange to hold the retainer in applied position on said panel member or the like with said thread engaging means thereof overlying the aperture in said panel member preparatory to securing said cooperating part thereto by a threaded fastening passing through said aperture.

9. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with an inturned flange arranged in generally parallel and spaced relation to the rearward side thereof, a channel-shaped retainer disposed between said body portion and flange comprising a sheet metal device having a pair of spaced arms one of which is frictionally engaged by said inturned flange to hold the retainer in applied position on said panel member or the like preparatory to securing said cooperating part thereto, one of said arms of the retainer carrying means for threadedly engaging a threaded fastening securing said cooperating part to said member.

10. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with a flange in spaced relation to the rearward side thereof, a channel-shaped retainer disposed between said body portion and flange comprising a sheet metal device having a pair of spaced arms and an intermediate web portion, one of said arms being frictionally engaged by said flange to hold the retainer in applied position on said panel member or the like preparatory to securing said cooperating part thereto, said web portion of the retainer including means for threadedly engaging a threaded fastening securing said cooperating part to said member.

11. A joint or connection of the class described comprising, in combination, a lightweight sheet metal structure provided with self-maintained means adapted to receive a threaded fastening for securing a cooperating part thereto, said structure comprising an apertured substantial panel member or the like having a body portion provided with a flange arranged in spaced relation to the rearward side thereof, a channel-shaped retainer disposed between said body portion and flange comprising a sheet metal device having a pair of spaced arms and an intermediate web portion provided with thread engaging means, one of said arms being frictionally engaged by said flange to hold the retainer in applied position on said panel member or the like with said thread engaging means on the web portion thereof in line with the aperture in said panel member or the like preparatory to securing said cooperating part thereto by a threaded fastening passing through said aperture.

12. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with an inturned flange arranged in generally parallel and spaced relation to the rearward side thereof, a channel-shaped retainer disposed between said body portion and flange comprising a sheet metal device having a pair of spaced arms and an intermediate web portion, one of said arms being frictionally engaged by said inturned flange to hold the retainer in applied position on said panel member or the like preparatory to securing said cooperating part thereto, said web portion of the retainer including means for threadedly engaging a threaded fastening securing said cooperating part to said member.

13. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with an apertured flange in spaced relation to the rearward side thereof, a channel-shaped retainer disposed between said body portion and flange comprising a sheet metal device having a pair of spaced arms one of which is provided with thread engaging means, one of said arms being frictionally engaged by the flange to hold the retainer in applied position on said panel member or the like with said thread engaging means in line with the aperture in said flange thereof preparatory to securing said cooperating part to said panel member or the like by a threaded fastening passing through said aperture in the flange.

14. A joint or connection of the class described comprising, in combination, a lightweight sheet metal structure provided with self-maintained means adapted to receive a threaded fastening for securing a cooperating part thereto, said structure comprising a substantial panel member or the like having an apertured body portion and provided with a flange in spaced relation to the rearward side thereof, a channel-shaped retainer disposed between said body portion and flange comprising a sheet metal device having a pair of spaced arms one of which is frictionally engaged by said flange to hold the retainer in applied position on said panel member or the like preparatory to securing said cooperating part thereto, one of said arms of the retainer including thread engaging means in line with the aperture in said body portion of the panel member for threadedly engaging a threaded fastening securing the cooperating part to said panel member or the like.

15. A joint or connection of the class described comprising, in combination, a lightweight sheet metal structure provided with self-maintained means adapted to receive a threaded fastening for securing a cooperating part thereto, said structure comprising a substantial panel member or the like having a body portion provided with an apertured flange in spaced relation to the rearward side thereof, a channel-shaped retainer provided with thread engaging means disposed between said body portion and flange, said retainer comprising a sheet metal device having a pair of spaced arms one of which is frictionally engaged by said flange to hold the retainer in applied position on said panel member or the like with said thread engaging means overlying the aperture in said flange thereof, said cooperating part having an attaching portion provided with an aperture which may be aligned with that in said flange on the panel member or the like to receive a threaded fastening passing through said aligned apertures into threaded engagement with said thread engaging means on the retainer.

16. A joint or connection of the class described comprising, in combination, a lightweight sheet metal structure provided with self-maintained means adapted to receive a threaded fastening for securing a cooperating part thereto, said sheet metal structure comprising a substantial panel member or the like having a body portion provided with an inturned flange in spaced relation to the rearward side thereof, said cooperating part having a flange including an attaching ear or the like provided with an aperture aligned with that in said inturned flange on the panel member or the like, a channel-shaped retainer disposed between said body portion and flange of the panel member comprising a sheet metal device having a pair of spaced arms one of which is provided with thread engaging means and is frictionally engaged by said inturned flange to hold the retainer in applied position on said panel member or the like with said thread engaging means overlying the aperture in said inturned flange, and a threaded fastening passing through said aligned apertures in the attaching ear and inturned flange into threaded engagement with said thread engaging means of the retainer.

17. A joint or connection of the class described comprising, in combination, a lightweight structure provided with self-maintained means adapted to receive a threaded fastening for securing a cooperating part thereto, said structure comprising a substantial panel member or the like having a curved body portion and provided with an apertured flange in spaced relation to the rearward side thereof, a channel-shaped retainer disposed between said curved body portion and flange comprising a sheet metal device having a pair of spaced arms one of which is formed substantially to the contour of said curved body portion, the other of said arms carrying thread engaging means and being frictionally engaged by said flange to hold the retainer in applied position on said panel member or the like with said thread engaging means in line with the aperture in said flange thereof preparatory to securing said cooperating part thereto by a threaded fastening passing through said aperture in the flange.

18. A joint or connection of the class described comprising, in combination, a lightweight structure provided with self-maintained means adapted to receive a threaded fastening for securing a cooperating part thereto, said structure comprising a substantial panel member or the like having a curved body portion provided with an apertured flange in spaced relation to the rearward side thereof, a channel-shaped retainer disposed between said curved body portion and flange comprising a sheet metal device having a pair of spaced arms one of which is formed substantially to the contour of said curved body portion, the other of said arms carrying thread engaging means and being frictionally engaged by said flange in the applied position of the retainer on said panel member or the like with said thread engaging means in line with the aperture in the flange thereof, said retainer including means for anchoring the same in such applied position on the panel member preparatory to securing said cooperating part thereto by a threaded fastening passing through said aperture in the flange.

19. A joint or connection of the class described comprising, in combination, a lightweight structure provided with self-maintained means adapted to receive a plurality of threaded fastenings for securing a cooperating part thereto, said structure comprising a substantial panel member or the like having spaced apertures and a flange in spaced relation to the rearward side thereof, a channel-shaped retainer disposed between said panel member and flange comprising a sheet metal device having a pair of spaced arms and provided with a plurality of thread engaging means having a spacing corresponding substantially to that of said apertures in the panel member, one of said arms of the retainer being frictionally engaged by said flange to hold the retainer in applied position on the panel member or the like with said thread engaging means thereof in line with the apertures in said panel member preparatory to securing said cooperating part thereto by threaded fastenings passing through said apertures into threaded engagement with said thread engaging means on the retainer.

20. A joint or connection of the class described comprising, in combination, a lightweight sheet metal structure provided with self-maintained means adapted to receive threaded fastenings for securing a cooperating part thereto, said structure comprising a substantial panel member or the like provided with spaced apertures and having an inturned flange arranged in generally parallel and spaced relation to the rearward side thereof, a channel-shaped retainer disposed between said panel member and flange comprising a sheet metal device having a pair of spaced arms and provided with spaced integral thread engaging means pressed therefrom having a spacing corresponding substantially to that of said apertures in the panel member, one of said arms being frictionally engaged by said inturned flange to hold the retainer in applied position on said panel member or the like with said spaced thread engaging means in line with the apertures therein for threadedly engaging threaded fastenings passing through said apertures in the panel member for securing said cooperating part thereto.

GEORGE A. TINNERMAN.